(12) United States Patent
Williams

(10) Patent No.: US 6,499,532 B1
(45) Date of Patent: Dec. 31, 2002

(54) ELECTRIC MOTOR COOLING SYSTEM

(76) Inventor: Kevin R. Williams, 12920 Steepleway Blvd. #39, Houston, TX (US) 77065

( * ) Notice: Subject to any disclaimer, the term of this patent is extended or adjusted under 35 U.S.C. 154(b) by 0 days.

(21) Appl. No.: 09/519,364

(22) Filed: Mar. 6, 2000

Related U.S. Application Data

(60) Provisional application No. 60/132,398, filed on May 4, 1999.

(51) Int. Cl.[7] .................................................. F24H 3/00
(52) U.S. Cl. ..................... 165/47; 165/104.14; 165/122; 310/52; 310/64; 310/58
(58) Field of Search .............................. 165/47, 104.14, 165/104.33, 104.21, 104.26, 104.34, 121–125; 361/700; 310/52, 54, 58, 59, 64, 65

(56) References Cited

U.S. PATENT DOCUMENTS

| | | | | |
|---|---|---|---|---|
| 3,801,843 A | * | 4/1974 | Corman et al. ................ | 310/52 |
| 3,807,493 A | * | 4/1974 | Stewart .................. | 165/104.14 |
| 4,322,646 A | * | 3/1982 | Persson ........................ | 310/64 |
| 4,706,739 A | * | 11/1987 | Noren ................... | 165/104.14 |
| 5,035,281 A | * | 7/1991 | Neuenfeldt et al. ..... | 165/104.14 |
| 5,738,166 A | * | 4/1998 | Chou .......................... | 165/122 |
| 5,806,583 A | * | 9/1998 | Suzuki et al. ............ | 165/104.4 |
| 5,844,333 A | * | 12/1998 | Sheerin ....................... | 310/52 |
| 6,246,134 B1 | * | 6/2001 | Berrong et al. ............... | 310/52 |
| 6,359,351 B1 | * | 3/2002 | Semba et al. .................. | 310/52 |

FOREIGN PATENT DOCUMENTS

| | | | | |
|---|---|---|---|---|
| DE | 0205243 | * | 12/1983 | ............ 165/104.14 |
| SU | 0 557252 | * | 5/1977 | ................... 165/47 |

* cited by examiner

*Primary Examiner*—Christopher Atkinson
(74) *Attorney, Agent, or Firm*—Harrison & Egbert

(57) ABSTRACT

An electric motor cooling system including an electric motor with an air coolant inlet and an air coolant outlet, a first housing extending over and affixed to the electric motor with an air flow passageway therein, a first blower secured to the first housing having an outlet connected to the air coolant inlet of the electric motor, a second housing affixed to the first housing with an air flow passageway therein, a second blower affixed within the second housing so as to force air through the air flow passageway of the second housing, and a heat pipe array affixed within the air flow passageways of the first and second housings such that the heat pipe array has a bottom half within the air flow passageway of the first housing and a top half located in the air flow passageway of the second housing. The first blower is a centrifugal blower.

13 Claims, 4 Drawing Sheets

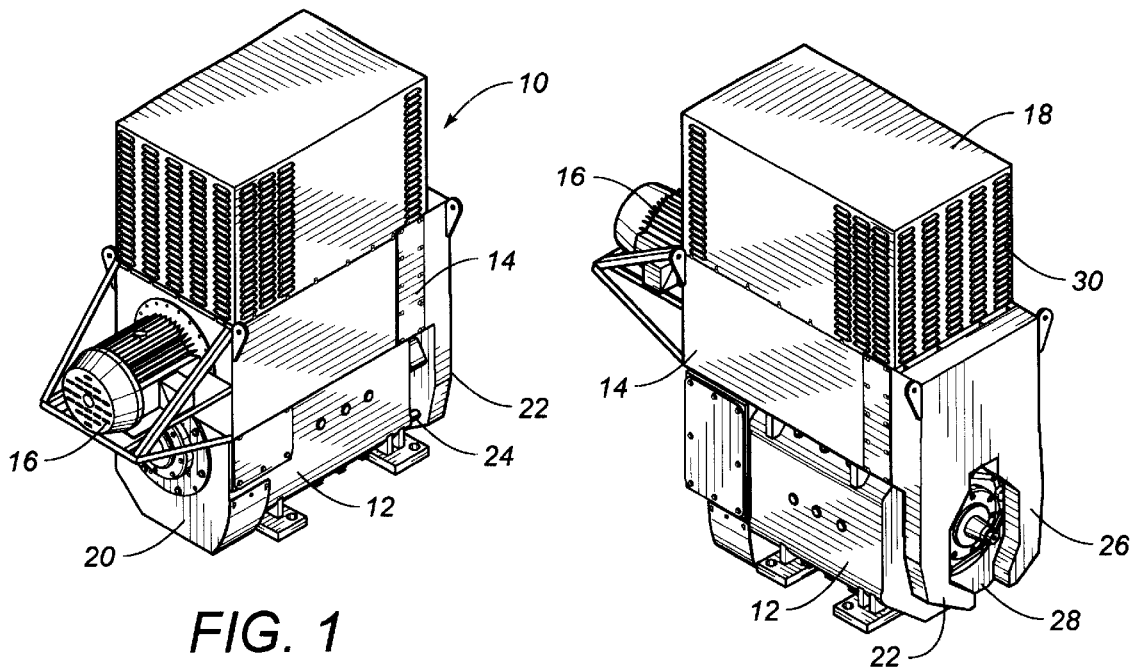
FIG. 1
FIG. 2
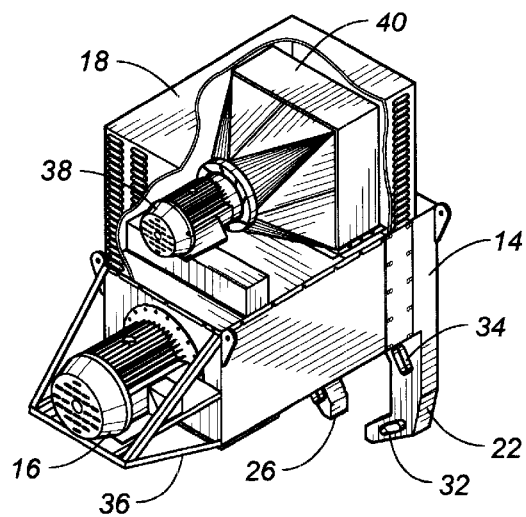
FIG. 3

ELECTRIC MOTOR COOLING SYSTEM

RELATED APPLICATION

The present utility patent application is based on earlier filed U.S. Provisional Application Ser. No. 60/132,398, filed on May 4, 1999, and entitled "ELECTRIC MOTOR COOLING SYSTEM", presently pending.

TECHNICAL FIELD

The present invention relates to devices for the cooling of electric motors. More particularly, the present invention relates to devices which use air to cool such electric motors. Additionally, the present invention relates to the use of heat pipes for the cooling of electric motors.

BACKGROUND ART

Electric motors have a wide variety of applications throughout industry. In particular, in the oil and mining industries, electric motors are heavily used so as to operate equipment and to power vehicles. Electric motors have been developed so as to have in excess of 1,000 horsepower or to operate at over 40,000 watts of losses that must be removed as unwanted heat.

These high-powered electric motors require a great deal of cooling capacity in order to operate effectively. Unlike conventional internal combustion engines, liquids cannot be used with electric motors for the purposes of cooling except in certain instances. Electric motors, because of the electrical windings and coils, must be "air cooled", as a standard means of cooling.

In some circumstances, these very large electric motors require the installation of piping so as to deliver water to the engine for cooling purposes. Whenever piping is installed, it becomes very difficult to install, to move or to relocate the electric motor. Additionally, the installation of such piping adds significant cost to the electric motor. In many circumstances, the electric motor is located in a position where the installation of such conduits and piping is nearly impossible.

It is an object of the present invention to provide an electric motor cooling system which facilitates the transportability of the electric motor.

It is another object of the present invention to provide an electric motor cooling system which eliminates the need for conduits and piping to bring water to the electric motor.

It is a further object of the present invention to provide an electric motor cooling system which can cool the electric motor while using a minimal amount of space.

It is still a further object of the present invention to provide an electric motor cooling system which can be applied to motors having in excess of 40,000 watt loss capacity.

It is still another object of the present invention to provide an electric motor cooling system which effectively cools the electric motor.

It is another object of the present invention to provide an electric motor cooling system which is easy to use, relatively inexpensive, and easy to install.

These and other objects and advantages of the present invention will become apparent from a reading of the attached specification and appended claims.

SUMMARY OF THE INVENTION

The present invention is an electric motor cooling system which comprises an electric motor having an air coolant inlet and an air coolant outlet, a first housing extending over the electric motor with an air flow passageway therein, a first blower secured to the first housing having an outlet connected to the air coolant inlet of the electric motor, a second housing affixed to the first housing and having an air flow passageway therein, a second blower affixed to the second housing so as to force air through the air flow passageway of the second housing, and a heat pipe array affixed within the air flow passageways of the first and second housings such that each of the heat pipes in the heat pipe array has a bottom half within the air flow passageway of the first housing and a top half located in the air flow passageway of the second housing. The electric motor, the first housing and the first blower define a closed air loop over the electric motor. The second housing and the second blower form an open circuit therethrough.

In the present invention, the first housing has an inlet which is connected to the air coolant outlet of the electric motor. The first housing includes a slotted opening therein which serves to receive the heat pipe array and to receive an air filter. The first housing includes a receptacle area for receiving the first blower therein. The first housing can be affixed to the body of the electric motor.

The first blower, in the preferred embodiment of the present invention, is a centrifugal blower. This first blower is affixed within the first housing. The first blower has an outlet which is connected to the air coolant inlet of the electric motor. The first blower serves to pass cooling air across the windings and coils within the electric motor.

The second housing is affixed to the first housing. The second housing has a receptacle suitable for the receipt of the top of the heat pipe array therein. The second housing has an air inlet end and an air outlet end. The second blower is affixed to the air inlet end of the second housing.

The heat pipe array includes a frame which has the array of heat pipes extending vertically therein. The frame can be placed within the openings in the first and second housing. This frame will include a suitable seal for sealingly isolating the air passageway of the first housing from the air passageway of the second housing. Suitable finned areas form the faces of the frame of the heat pipe array. The heat pipe array is placed between the finned faces of the frame.

In the present invention, an air filter may be placed adjacent to the heat pipe array between the air coolant outlet of the electric motor and the heat pipe array.

BRIEF DESCRIPTION OF THE DRAWINGS

FIG. 1 is a back upper perspective view of the electric motor cooling system in accordance with the preferred embodiment of the present invention.

FIG. 2 is a frontal upper perspective view of the electric motor cooling system of the present invention.

FIG. 3 is an upper perspective, partially transparent, view of the cooling system with the electric motor removed.

DETAILED DESCRIPTION OF THE INVENTION

Figure 4:
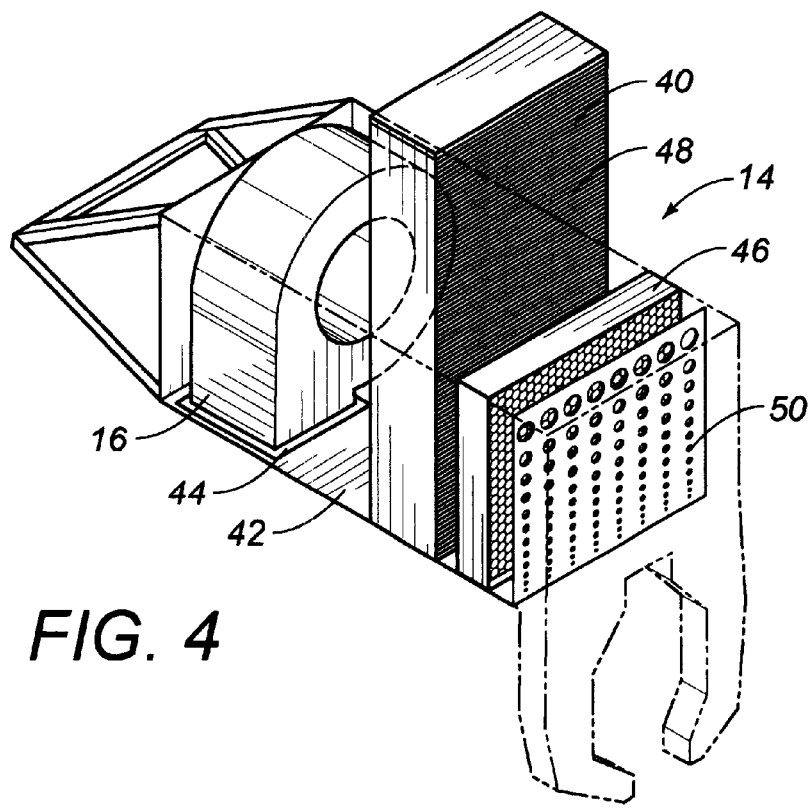
FIG. 4 is a partially exploded view of the first housing, blower and heat pipe array of the present invention.

Referring to FIG. 1, there is shown at 10 the electric motor cooling system in accordance with the preferred embodiment of the present invention. The electric motor cooling system 10 includes an electric motor 12, a first housing 14, a first blower 16 and a second housing 18. In FIG. 1, the first housing 14 is affixed to the top of the electric motor 12. The blower 16 is secured to the housing 14 adjacent to the rear 20 of the electric motor 12. The housing 14 has downwardly extending connector sections 22 which engage with the air coolant outlet 24 of the electric motor 12. The second housing 18 is shown as affixed to the top surface of the first housing 14.

FIG. 2 shows how the conduits 22 and 26 extend downwardly over the forward end 28 of the electric motor 12. As such, the conduits 22 and 26 can be secured to the air coolant outlets of the electric motor 12. The heated air from the electric motor 12 will pass into the conduits 22 and 24 and upwardly into the first housing 14. The blower 16 will serve to deliver cooled air downwardly into the air coolant inlet of the electric motor 12.

FIG. 2 also illustrates how the second housing 18 is secured to the top of the first housing 14. Since the second housing 18 is an open loop system, as opposed to the closed loop system of the first housing 14, suitable finned areas 30 can be formed around the second housing 18 so as to allow the passage of air thereinto and therefrom.

FIG. 3 shows the arrangement of the first housing 14 with its conduits 22 and 26 extending downwardly therefrom. As can be seen, air inlet openings 32 and 34 can be connected to the air outlets associated with the electric motor 12. The first blower 16 is affixed by framework 36 to the first housing 14.

In FIG. 3, it can be seen that the second housing 18 includes a second blower 38 affixed therein. The second blower 38 causes air to pass over and through the frame 40 associated with the heat pipe array. As will be described hereinafter, the top of the heat pipe array within frame 40 will be located within the air passageway of the second housing 18. The bottom of the heat pipe array within frame 40 will be located within the air passageway associated with the first housing 14.

FIG. 4 is an exploded view showing the internal configuration of the first housing 14. The first housing 14 has a centrifugal blower 16 positioned therein. An air passageway 42 will extend from the frame 40 of the heat pipe array to the blower 16. The blower 16 will serve to draw air across the heat pipe array and back into the air coolant inlet of the electric motor 12 through opening 44 at the bottom of the centrifugal blower 16. An air filter 46 is positioned adjacent to a face 48 of the frame 40 of the heat pipe array. Air filter 46 is placed within air passageway 42 of housing 14 so as to remove particles passing from the air coolant outlet of the electric motor 12 before such particles enter the centrifugal blower 16. A plate 50 is secured to the face of the filter 46 so as to further block particle flow therethrough and to establish a laminar flow of air therethrough.

Figure 5:
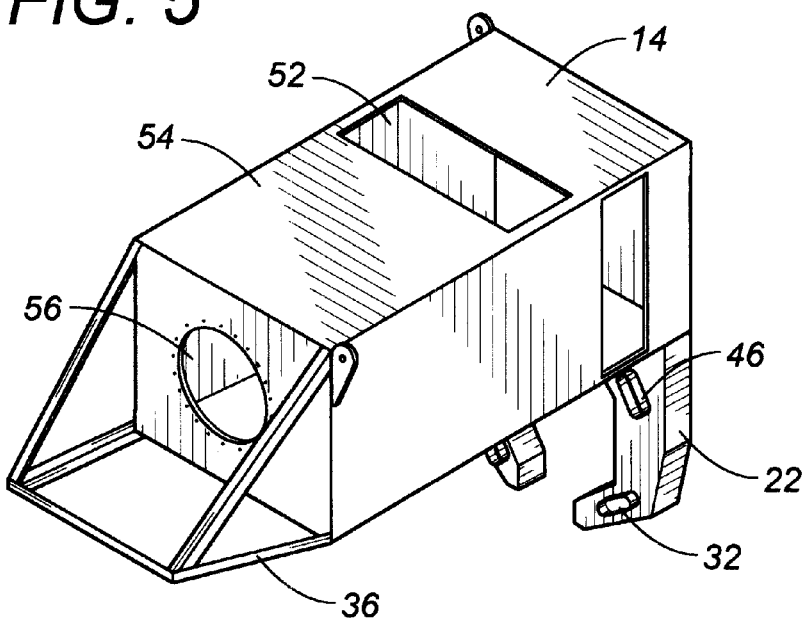
FIG. 5 is an isolated perspective view of the first housing of the present invention.

FIG. 5 shows the first housing 14 with the components removed. In FIG. 5, it can be seen that the air inlets 32 and 34 are formed, on the conduit 22. This allows heated air from the electric motor 12 to enter into the air flow passageway 42 within the housing 14. An opening 52 is formed on the top surface 54 of the housing 14. Opening 52 allows the bottom half of the frame 40 of the heat pipe array to be inserted thereinto. Opening 52 will facilitate the ability to sealingly receive the frame 40 of the heat pipe array therein. An opening 56 is formed at the back end of the housing 40 so as to allow the blower motor to be attached thereto. Framework 36 extends outwardly from the back of the housing 14 so as to support the body of the blower motor 16.

Figure 6:
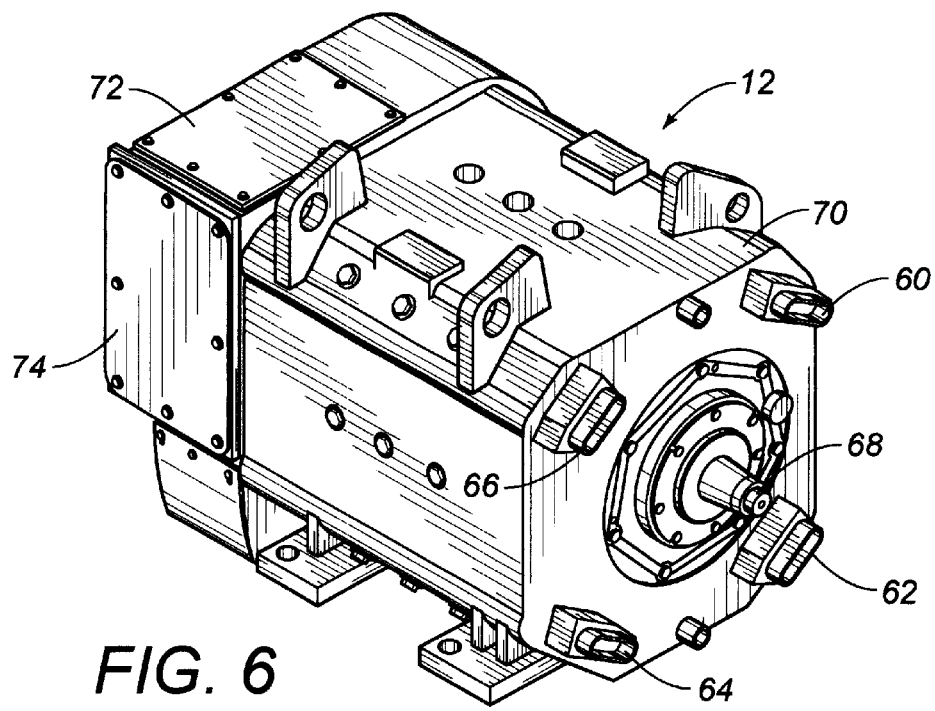
FIG. 6 is a frontal perspective view of an electric motor as used in the present invention.

FIG. 6 shows the details of the electric motor 12. Initially, it can be seen that the electric motor 12 includes air outlets 60, 62, 64 and 66 arranged around the shaft 68. These air coolant outlets 60, 62, 64 and 66 can be joined to the suitable inlets 32 and 34 associated with conduits 22 and 26 of the first housing 14. The first housing 14 can be mounted to the top surface 70 of the motor 12.

In FIG. 6, it can be seen that the motor 12 includes panels 72 and 74 removably attached at a rear of the motor 12. Panels 72 and 74 can be suitably removed or attached so as to receive centrifugal blower 16 either on the top 70 or on the side 74 of the motor 12. The centrifugal blower will force cooling air downwardly into and through the interior of the electric motor 12.

Figure 7:
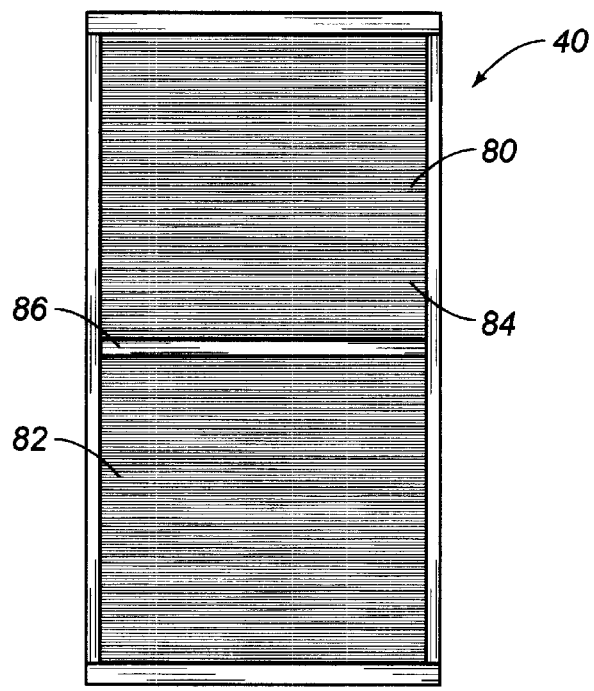
FIG. 7 is a frontal view of the heat pipe array of the present invention.

FIG. 7 shows the frame 40 associated with the heat pipe array of the present invention. The frame 40 has a generally rectangular configuration with a finned face 80 extending thereacross. The bottom half 82 of frame 40 will be received within the air flow passageway 42 of the first housing 14. The top half 84 of the frame 40 will be received within the air flow passageway of the second housing 18. A sealing strip 86 will extend thereacross so as to fit in sealed contact at the opening 52 of the first housing 14 and a bottom opening associated with the second housing 18. As such, the bottom half 82 will be sealingly isolated in the air flow passageway of the first housing 14 from the top half 84 which is sealingly isolated within the air flow passageway of the second housing 18. The heat pipe array, as will be described hereinafter, will extend vertically across the bottom half 82 and the top half 84 within the frame 40.

Figure 8:
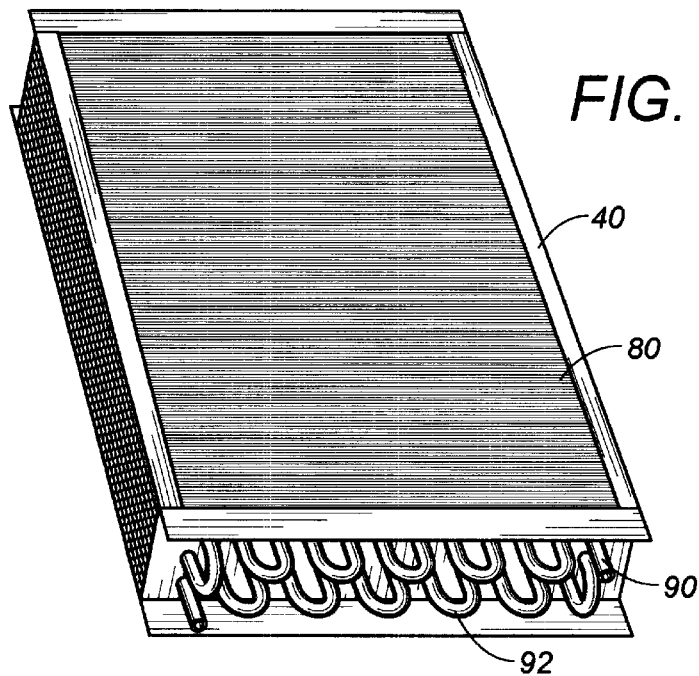
FIG. 8 is a bottom perspective view of the heat pipe array of the present invention.

FIG. 8 is a view of the frame 40 associated with the heat pipe array 90. In FIG. 8, it can be seen that the frame 40 includes a finned outer face 80. Finned outer face 80 will allow air to the heat pipe array 90. FIG. 8 shows how the bottoms 92 of the heat pipe array 90 extend outwardly therefrom. The frame 40 has a configuration suitable for slidable insertion into the housings 14 and 18 associated with the electric motor cooling system of the present invention.

Figure 9:
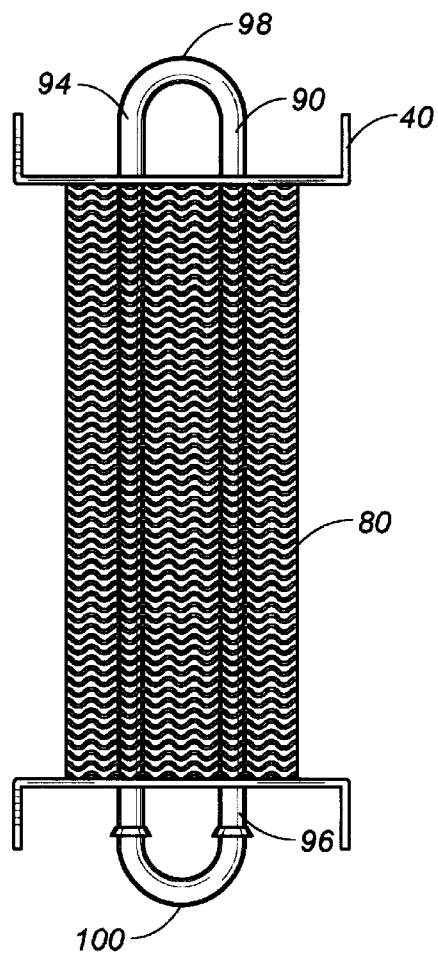
FIG. 9 is a diagrammatic illustration of the heat pipe array of the present invention.

FIG. 9 is a detailed and diagrammatic interior view of the frame 40. As can be seen, finned surface 80 will extend across the surface of the heat pipe array 90. Each of the heat pipes 94 and 96 of the heat pipe array 90 are vertical tubes that have a top end 98 and a bottom end 100. This configuration allows for the heat pipes 94 and 96 to transport heated fluid to the top 94 while also passing cooled fluid to the bottom 100.

Heat pipes are existing technology that are conventionally used with very small electric motors associated with computer technology. Heat pipes remove heat from the source in a two-phase process. As heat is generated, a liquid at one end of the pipe evaporates and releases the heat to a heat sink by condensation at the other end. The liquid is returned to start the process over through a wick structure on the inside of the heat pipe.

Heat pipes are relatively simple devices. They passively transfer heat from the heat source to a heat sink where the heat is dissipated. The heat pipe itself is a vacuum-type vessel that is evacuated and partially filled with a minute amount of water or other working fluid. As heat is directed into the device, the fluid is vaporized so as to create a pressure gradient in the pipe. This forces the vapor to flow along the pipe to the cooler section where it condenses, giving up its latent heat of vaporization. The working fluid is then returned to the evaporator by capillary forces developed in the heat pipe's porous wick structure or by gravity.

As used herein, the heated air from the electric motor 12 will pass across the bottom half 82 of the heat pipe array, 90.

This will heat the liquid at the end 100. The evaporated heat from the end 100 then flows upwardly through the heat pipe array 90 into the upper half 84. The interaction of the blower 38 within the second housing 40 will pass cooling air across the heat pipe array 90. As such, heat is released to a heat sink by condensation. The cooled liquid is then returned to the bottom 100 so as to start the process over again. As a result, the heated air passing across the bottom half 82 of the heat pipe array 90 will be cooled before it is passed, again, through the air coolant inlet of the electric motor 12. As such, the electric motor 12, the housing 14 and the blower 16 create a "closed loop" system. There is no need to connect the electric motor 12 to any piping or sources of external air. It can be seen from the figures of the present application, the electric motor 12, along with its cooling system 10, can be configured in a unitary compact arrangement. In order to properly use the electric motor 12, it is only necessary to establish the proper electrical connections.

The foregoing disclosure and description of the invention is illustrative and explanatory thereof. Various changes can be made to the present invention without departing from the true spirit of the present invention.

I claim:

1. A cooling system comprising:
   an electric motor having an air coolant inlet at one end and an air coolant outlet at an opposite end thereof;
   a first housing extending over a top of and affixed to said electric motor, said first housing having an air flow passageway therein;
   a first blower received within said first housing, said first blower having an outlet connected to said air coolant inlet of said electric motor, said first housing having an inlet connected to said air coolant outlet of said electric motor;
   a second housing affixed to a top of said first housing, said second housing having an air flow passageway therein;
   a second blower received within said second housing so as to force air through said air flow passageway of said second housing; and
   a heat pipe array affixed within said air flow passageways of said first and second housings such that said heat pipe array has a bottom portion within said air flow passageway of said first housing and a top portion located in said air flow passageway of said second housing.

2. The cooling system of claim 1, said first housing having a conduit extending downwardly therefrom so as to connect said air coolant outlet of said electric motor to said air flow passageway of said first housing.

3. The cooling system of claim 1, said first housing further comprising a slotted pipe opening and a receptacle area, said slotted opening receiving a bottom of said heat array, said receptacle area receiving said first blower therein.

4. The cooling system of claim 1, said second housing further comprising a slotted opening and a receptacle area, said slotted opening receiving a top of said heat pipe array, said receptacle area receiving said second blower therein.

5. The cooling system of claim 4, wherein said second housing has finned openings so as to allow passage of air into and therefrom.

6. The cooling system of claim 1, wherein said second housing defines an open air flow circuit such that said second blower passes cooling air across said top of said heat pipe array.

7. The cooling system of claim 1, said heat pipe array further comprising a frame with a plurality of heat pipes extending vertically therein.

8. The cooling system of claim 7, said first housing having a slotted opening, said second housing having a slotted opening aligned with said slotted opening of said first housing, said frame being received within said slotted openings of said first and second housings.

9. The cooling system of claim 8, said frame having a seal means thereon, said seal means for sealingly isolating said air flow passageway of said first housing form said air flow passageway of said second housing.

10. The cooling system of claim 7, said frame having faces on opposite sides of said plurality of heat pipes, each of said faces having a finned area thereon.

11. The cooling system of claim 1, said first housing having an air filter placed adjacent to said heat pipe array between said air coolant outlet of said electric motor and said heat pipe array.

12. A cooling system comprising:
    an electric motor having an air coolant inlet at one end and an air coolant outlet at an opposite end thereof;
    a first housing extending over and affixed to said electric motor with an air flow passageway therein, said first housing defining a closed loop air flow circuit with said air coolant inlet and with said electric motor;
    a first blower received within said first housing, said first blower having an outlet connected to said air coolant inlet of said electric motor, said first housing having an inlet connected to said air coolant outlet of said electric motor;
    a second housing affixed to said first housing, said second housing having an air
    a second blower received within said second housing so as to force air through said air flow passageway of said second housing; and
    a heat pipe array affixed within said air flow passageways of said first and second housings such that said heat pipe array has a bottom portion within said air flow passageway of said first housing and a top portion located in said air flow passageway of said second housing.

13. A cooling system comprising:
    an electric motor having an air coolant inlet at one end and an air coolant outlet at an opposite end thereof;
    a first housing extending over and affixed to said electric motor with an air flow passageway therein;
    a first blower received within said first housing, said first blower having an outlet connected to said air coolant inlet of said electric motor, said first housing having an inlet connected to said air coolant outlet of said electric motor, said first blower being a centrifugal blower with an outlet directed to said air coolant inlet of said electric motor;
    a second housing affixed to said first housing on a side of said first housing opposite said electric motor, said second housing having an air flow passageway therein;
    a second blower received within said second housing so as to force air through said air flow passageway of said second housing; and
    a heat pipe array affixed within said air flow passageways of said first and second housings such that said heat pipe array has a bottom portion within said air flow passageway of said first housing and a top portion located in said air flow passageway of said second housing.

\* \* \* \* \*